(12) United States Patent
Talamanchi et al.

(10) Patent No.: US 10,021,125 B2
(45) Date of Patent: Jul. 10, 2018

(54) INFRASTRUCTURE MONITORING TOOL FOR COLLECTING INDUSTRIAL PROCESS CONTROL AND AUTOMATION SYSTEM RISK DATA

(71) Applicant: Honeywell International Inc., Morris Plains, NJ (US)

(72) Inventors: Venkata Srinivasulu Reddy Talamanchi, Bangalore (IN); Kenneth W. Dietrich, Glendale, AZ (US); Eric T. Boice, Mesa, AZ (US); Andrew W. Kowalczyk, Phoenix, AZ (US); Ganesh P. Gadhe, Pune (IN)

(73) Assignee: Honeywell International Inc., Morris Plains, NJ (US)

( * ) Notice: Subject to any disclaimer, the term of this patent is extended or adjusted under 35 U.S.C. 154(b) by 12 days.

(21) Appl. No.: 14/871,732

(22) Filed: Sep. 30, 2015

(65) Prior Publication Data

US 2016/0234241 A1  Aug. 11, 2016

Related U.S. Application Data

(60) Provisional application No. 62/113,186, filed on Feb. 6, 2015.

(51) Int. Cl.
*G06F 21/57* (2013.01)
*H04L 29/06* (2006.01)
(Continued)

(52) U.S. Cl.
CPC ........ *H04L 63/1433* (2013.01); *G06F 21/552* (2013.01); *G06F 21/577* (2013.01);
(Continued)

(58) Field of Classification Search
CPC . H04L 63/14; H04L 63/1408; H04L 63/1416; H04L 63/1425; H04L 63/1433;
(Continued)

(56) References Cited

U.S. PATENT DOCUMENTS

| 6,266,773 B1 | 7/2001 | Kisor et al. |
| 7,136,856 B2 | 11/2006 | Birbo et al. |

(Continued)

FOREIGN PATENT DOCUMENTS

| JP | 2008-112284 | 5/2008 |
| KR | 10-2005-0068052 | 7/2005 |

(Continued)

OTHER PUBLICATIONS

International Search Report and Written Opinion issued for PCT/US2016/015890 dated May 13, 2016, 11 pgs.

(Continued)

*Primary Examiner* — Theodore C Parsons
(74) *Attorney, Agent, or Firm* — Anthony Miologos

(57) ABSTRACT

This disclosure provides an infrastructure monitoring tool, and related systems and methods, for collecting industrial process control and automation system risk data, and other data. A method includes discovering multiple devices in a computing system by a risk manager system. The method includes grouping the multiple devices into multiple security zones by the risk manager system. The method includes, for each security zone, causing one or more devices in that security zone to provide information to the risk manager system identifying alerts and events associated with the one or more devices. The method includes storing the information, by the risk manager system, in association with unique identifier values, the unique identifier values identifying different types of information.

23 Claims, 3 Drawing Sheets

(51) Int. Cl.
*H04L 12/24* (2006.01)
*G06F 21/55* (2013.01)

(52) U.S. Cl.
CPC ...... *H04L 41/0631* (2013.01); *H04L 41/0803* (2013.01); *H04L 63/20* (2013.01)

(58) Field of Classification Search
CPC . H04L 63/20; H04L 41/0631; H04L 41/0803; G06F 21/50; G06F 21/52; G06F 21/54; G06F 21/55; G06F 21/552; G06F 21/554; G06F 21/56; G06F 21/566; G06F 21/567; G06F 21/57; G06F 21/577; G06F 2221/034
See application file for complete search history.

(56) References Cited

U.S. PATENT DOCUMENTS

| | | | |
|---|---|---|---|
| 7,152,105 B2 | 12/2006 | McClure et al. | |
| 7,415,503 B2 | 8/2008 | Chernoguzov | |
| 7,627,891 B2 | 12/2009 | Williams et al. | |
| 7,900,259 B2* | 3/2011 | Jeschke | H04L 63/1433 713/164 |
| 7,908,660 B2* | 3/2011 | Bahl | G06F 21/577 726/25 |
| 7,921,459 B2 | 4/2011 | Houston et al. | |
| 7,984,504 B2 | 7/2011 | Hernacki et al. | |
| 8,020,210 B2 | 9/2011 | Tippett et al. | |
| 8,087,087 B1 | 12/2011 | Oorschot et al. | |
| 8,141,155 B2* | 3/2012 | Jeschke | H04L 63/1433 713/161 |
| 8,392,995 B2 | 3/2013 | Williamson et al. | |
| 8,438,643 B2 | 5/2013 | Wiemer et al. | |
| 8,494,974 B2 | 7/2013 | Watters et al. | |
| 8,595,831 B2 | 11/2013 | Skare | |
| 8,595,844 B2* | 11/2013 | Bahl | G06F 21/577 713/165 |
| 8,621,637 B2 | 12/2013 | Al-Harbi et al. | |
| 8,712,596 B2 | 4/2014 | Scott | |
| 8,726,393 B2 | 5/2014 | Macy et al. | |
| 8,763,074 B2 | 6/2014 | Bechtel et al. | |
| 8,769,412 B2 | 7/2014 | Gill et al. | |
| 8,776,168 B1 | 7/2014 | Gibson et al. | |
| 8,806,632 B2 | 8/2014 | Stefanidakis et al. | |
| 8,856,936 B2 | 10/2014 | Datta Ray et al. | |
| 9,166,999 B1 | 10/2015 | Kulkarni et al. | |
| 9,373,267 B2 | 6/2016 | Sadeh-Koniecpol et al. | |
| 9,401,926 B1* | 7/2016 | Dubow | H04L 63/1433 |
| 2003/0126472 A1 | 7/2003 | Banzhof | |
| 2003/0154393 A1 | 8/2003 | Young | |
| 2003/0204632 A1* | 10/2003 | Willebeek-LeMair | H04L 29/06 709/249 |
| 2004/0030531 A1 | 2/2004 | Miller et al. | |
| 2004/0193907 A1 | 9/2004 | Patanella | |
| 2004/0193943 A1* | 9/2004 | Angelino | H04L 63/1408 714/4.1 |
| 2005/0010821 A1 | 1/2005 | Cooper et al. | |
| 2005/0144480 A1 | 6/2005 | Kim et al. | |
| 2005/0193430 A1 | 9/2005 | Cohen et al. | |
| 2005/0283751 A1 | 12/2005 | Bassin et al. | |
| 2006/0010493 A1 | 1/2006 | Piesco et al. | |
| 2006/0085852 A1 | 4/2006 | Sima | |
| 2006/0101517 A1 | 5/2006 | Banzhof et al. | |
| 2006/0117388 A1 | 6/2006 | Nelson et al. | |
| 2006/0123482 A1 | 6/2006 | Aaron | |
| 2006/0126501 A1 | 6/2006 | Ramaswamy | |
| 2006/0174121 A1 | 8/2006 | Omae et al. | |
| 2006/0206941 A1 | 9/2006 | Collins | |
| 2006/0239645 A1 | 10/2006 | Curtner et al. | |
| 2007/0067846 A1 | 3/2007 | McFarlane et al. | |
| 2007/0094491 A1 | 4/2007 | Teo et al. | |
| 2007/0143851 A1 | 6/2007 | Nicodemus et al. | |
| 2007/0223398 A1 | 9/2007 | Luo et al. | |
| 2007/0226794 A1 | 9/2007 | Howcroft et al. | |
| 2007/0289008 A1 | 12/2007 | Andreev et al. | |
| 2008/0016339 A1 | 1/2008 | Shukla | |
| 2008/0047016 A1 | 2/2008 | Spoonamore | |
| 2008/0141377 A1 | 6/2008 | Dunagan et al. | |
| 2008/0172347 A1 | 7/2008 | Bernoth et al. | |
| 2008/0189788 A1* | 8/2008 | Bahl | G06F 21/577 726/25 |
| 2008/0209567 A1 | 8/2008 | Lockhart et al. | |
| 2008/0229420 A1* | 9/2008 | Jeschke | H04L 63/1433 726/25 |
| 2008/0235196 A1 | 9/2008 | Broussard et al. | |
| 2008/0262822 A1 | 10/2008 | Hardwick et al. | |
| 2009/0024663 A1 | 1/2009 | McGovern | |
| 2009/0121860 A1 | 5/2009 | Kimmel et al. | |
| 2009/0228316 A1 | 9/2009 | Foley et al. | |
| 2010/0121929 A1 | 5/2010 | Lin | |
| 2010/0125911 A1 | 5/2010 | Bhaskaran | |
| 2010/0125912 A1 | 5/2010 | Greenshpon et al. | |
| 2010/0242114 A1 | 9/2010 | Bunker et al. | |
| 2010/0318512 A1 | 12/2010 | Ludwig | |
| 2010/0324945 A1 | 12/2010 | Hessing | |
| 2011/0039237 A1 | 2/2011 | Skare | |
| 2011/0126111 A1* | 5/2011 | Gill | G06F 21/55 715/736 |
| 2011/0162073 A1* | 6/2011 | Jeschke | H04L 63/1433 726/25 |
| 2011/0231412 A1 | 9/2011 | Kariv | |
| 2011/0288692 A1* | 11/2011 | Scott | G06F 21/55 700/297 |
| 2012/0011077 A1 | 1/2012 | Bhagat | |
| 2012/0011590 A1 | 1/2012 | Donovan | |
| 2012/0109834 A1 | 5/2012 | Bongiovanni et al. | |
| 2012/0180133 A1 | 7/2012 | Al-Harbi et al. | |
| 2012/0224057 A1 | 9/2012 | Gill et al. | |
| 2012/0255003 A1 | 10/2012 | Sallam | |
| 2012/0268269 A1 | 10/2012 | Doyle | |
| 2013/0031037 A1* | 1/2013 | Brandt | H04L 63/1408 706/12 |
| 2013/0067558 A1 | 3/2013 | Markham et al. | |
| 2013/0111275 A1* | 5/2013 | Ganesan | G06F 11/0748 714/49 |
| 2013/0160119 A1 | 6/2013 | Sartin et al. | |
| 2013/0174259 A1 | 7/2013 | Pearcy et al. | |
| 2013/0212685 A1 | 8/2013 | Kelley et al. | |
| 2013/0239177 A1 | 9/2013 | Sigurdson et al. | |
| 2013/0247207 A1 | 9/2013 | Hugard et al. | |
| 2013/0283336 A1 | 10/2013 | Macy et al. | |
| 2013/0298244 A1* | 11/2013 | Kumar | G06F 21/52 726/25 |
| 2013/0326002 A1 | 12/2013 | Leuoth et al. | |
| 2013/0347107 A1 | 12/2013 | Williams et al. | |
| 2014/0007244 A1 | 1/2014 | Martin et al. | |
| 2014/0013434 A1* | 1/2014 | Ranum | H04L 63/145 726/24 |
| 2014/0075564 A1* | 3/2014 | Singla | H04L 43/50 726/25 |
| 2014/0082738 A1* | 3/2014 | Bahl | G06F 21/577 726/25 |
| 2014/0130121 A1 | 5/2014 | Lin | |
| 2014/0137257 A1 | 5/2014 | Martinez et al. | |
| 2014/0165128 A1 | 6/2014 | Auvenshine et al. | |
| 2014/0215555 A1 | 7/2014 | Barton et al. | |
| 2014/0236668 A1 | 8/2014 | Young et al. | |
| 2014/0283083 A1 | 9/2014 | Gula et al. | |
| 2014/0289796 A1 | 9/2014 | Moloian et al. | |
| 2014/0297495 A1 | 10/2014 | Dalal et al. | |
| 2014/0305525 A1 | 10/2014 | Le Moing et al. | |
| 2014/0337086 A1* | 11/2014 | Asenjo | G06Q 10/0635 705/7.28 |
| 2014/0359777 A1 | 12/2014 | Lam et al. | |
| 2015/0018984 A1 | 1/2015 | Williams et al. | |
| 2015/0032839 A1* | 1/2015 | Serokurov | H04L 67/1031 709/214 |
| 2015/0033323 A1 | 1/2015 | Oliphant et al. | |
| 2015/0033337 A1* | 1/2015 | Baikalov | H04L 63/1408 726/23 |
| 2015/0163242 A1* | 6/2015 | Laidlaw | G06F 21/552 726/22 |

(56) References Cited

U.S. PATENT DOCUMENTS

| | | | |
|---|---|---|---|
| 2015/0213369 A1* | 7/2015 | Brandt | H04L 63/1408 706/12 |
| 2015/0242769 A1 | 8/2015 | Kezeu | |
| 2015/0264061 A1 | 9/2015 | Ibatullin et al. | |
| 2015/0281287 A1* | 10/2015 | Gill | G06F 21/55 726/1 |
| 2015/0370983 A1 | 12/2015 | Vial et al. | |
| 2016/0011921 A1 | 1/2016 | Rao et al. | |
| 2016/0164892 A1* | 6/2016 | Satish | H04L 63/20 726/23 |
| 2016/0205126 A1* | 7/2016 | Boyer | H04L 63/1433 726/25 |
| 2016/0205143 A1 | 7/2016 | Bryson et al. | |
| 2016/0212165 A1* | 7/2016 | Singla | G06F 21/577 |
| 2016/0217160 A1* | 7/2016 | Croft | G06F 17/30551 |
| 2016/0330222 A1* | 11/2016 | Brandt | H04L 63/1408 |

FOREIGN PATENT DOCUMENTS

| | | |
|---|---|---|
| KR | 10-1060277 | 8/2011 |
| KR | 10-2014-0097691 | 8/2014 |
| WO | WO 2013/166126 A1 | 11/2013 |

OTHER PUBLICATIONS

Notification of Transmittal of International Search Report and the Written Opinion of the International Searching Authority, or the Declaration dated Jun. 3, 2016 in connection with International Application No. PCT/US2016/016798, 10 pages.

Notification of Transmittal of International Search Report and the Written Opinion of the International Searching Authority, or the Declaration dated May 18, 2016 in connection with International Application No. PCT/US2016/016159, 11 pages.

Notification of Transmittal of International Search Report and the Written Opinion of the International Searching Authority, or the Declaration dated May 13, 2016 in connection with International Application No. PCT/US2016/016098, 12 page.

Notification of Transmittal of International Search Report and the Written Opinion of the International Searching Authority, or the Declaration dated Jun. 13, 2016 in connection with International Application No. PCT/US2016/016496, 12 pages.

Notification of Transmittal of International Search Report and the Written Opinion of the International Searching Authority, or the Declaration dated Jun. 3, 2016 in connection with International Application No. PCT/US2016/016399, 11 pages.

Notification of Transmittal of International Search Report and the Written Opinion of the International Searching Authority, or the Declaration dated Jun. 3, 2016 in connection with International Application No. PCT/US2016/016265, 10 pages.

Notification of Transmittal of International Search Report and the Written Opinion of the International Searching Authority, or the Declaration dated Jun. 2, 2016 in connection with International Application No. PCT/US2016/015952, 11 pages.

Gerhards, R.; "The Syslog Protocol"; Network Working Group; Adiscon GmbH; Mar. 2009; 38 pages.

Knapp, E.D.; "Security Intelligence and Analytics in Industrial Systems"; Honeywell Users Group Europe, Middle East and Africa; 2014; 29 pages.

Koelemij, E.D.; "Effective Defense in Depth Strategies for Industrial Control Systems"; Honeywell Users Group Europe, Middle East and Africa; 2014; 21 pages.

Koelemij, S.; "Designing a Secure Industrial Control System"; Honeywell Users Group EMEA; Industrial IT Solutions: 2013; 11 pages.

Koelemij, S.; "Making Cyber Security S.M.A.R.T."; Honeywell Industrial Cyber Security; EMEA HUG Training Session; 2014; 63 pages.

Ricks, B.; "System Center 2012 R2 Operations Manager Documentation"; Microsoft System Center 2012 R2; Microsoft Corp; Nov. 1, 2013; 1389 pages.

Spear, M.; "Industrial Cyber Security 101"; Honeywell Users Group Europe, Middle East and Africa; 2015; 25 pages.

"Certification Testing Specification"; OPC Foundation; Release Candidate 1.02; May 28, 2014; 20 pages.

"Guide for Conducting Risk Assessments—Information Security"; NIST Special Publication 800-30, Revision 1; NIST, U.S. Dept of Commerce; Sep. 2012; 95 pages.

"Honeywell Industrial Cyber Security Overview and Managed Industrial Cyber Security Services"; HPS; Jun. 4, 2014; 19 pages.

"Information Technology—Security Techniques—Information Security Risk Management"; Bio Standards Publication; BS ISO/IEC 27005;2011; 80 pages.

"Risk Management and Critical Infrastructure Protection: Assessing, Integrating, and Managing Threats, Vulnerabilities and Consequences"; CRS Rpt for Congress; RL32561; Feb. 4, 2005; 28 pages.

"Security for Industrial Automation and Control Systems Part 2-3: Patch Management in the IACS Environment"; ISA-TR62443-2-3-2015; Jul. 1, 2015; 18 pages.

"Design and Planning Guide for System Center 2012—Operations Manager"; System Center 2012; Microsoft Corporation; Apr. 2012; 13 pages.

Hutzler, D., "How to Prevent Attacks on Air Gapped Networks," OPSWAT Blog, https://www.opswat.com/blog/how-prevent-attacks-air-gapped-networks, Jan. 16, 2015, 5 pages.

Marshall, R., "Guest Post: How to Configure Alerts in System Center 2012," https://blogs.technet.microsoft.com/uktechnet/2013/04/08/guest-post-how-to-configure-alerts-in-system-center-2012/, Apr. 8, 2013, 9 pages.

"Symantec™ Control Compliance Suite 11.0 Use Guide," Symantec Corporation, https://www.scribd.com/document/126556709/CCS-User-Guide; 2012, 952 pages.

"Configuring Symantec Vulnerability Assessment 1.0 for Network Audits," TECH111985, https://support.symantec.com/en_US/article.TECH111985.html, Jan. 16, 2003, 6 pages.

"iPost: Implementing Continuous Risk Monitoring at the Department of State," Enterprise Network Management, U.S. Department of State, Information Resource Management Office of Information Assurance, Version 1.5, May 14, 2010, 28 pages.

U.S. Appl. No. 14/871,695, Non-Final Office Action dated Dec. 16, 2016, 11 pages.

U.S. Appl. No. 14/871,521, Non-Final Office Action dated Dec. 19, 2016, 11 pages.

U.S. Appl. No. 14/871,855, Non-Final Office Action dated Jan. 18, 2017, 12 pages.

U.S. Appl. No. 14/871,503, Non-Final Office Action dated Dec. 28, 2016, 11 pages.

U.S. Appl. No. 14/871,547, Non-Final Office Action dated Dec. 16, 2016, 12 pages.

U.S. Appl. No. 14/871,605, Non-Final Office Action dated Dec. 19, 2016, 13 pages.

U.S. Appl. No. 14/871,814, Non-Final Office Action dated Dec. 16, 2016, 7 pages.

U.S. Appl. No. 14/871,136, Non-Final Office Action dated Dec. 2, 2016, 18 pages.

U.S. Appl. No. 14/705,379, Non-Final Office Action dated Feb. 7, 2017, 7 pages.

Foreign Communication From a Related Counterpart Application, PCT Application No. PCT/US2016/028553, International Search Report and Written Opinion dated Apr. 21, 2016, 10 pages.

* cited by examiner

INFRASTRUCTURE MONITORING TOOL FOR COLLECTING INDUSTRIAL PROCESS CONTROL AND AUTOMATION SYSTEM RISK DATA

This application claims the benefit of the filing date of U.S. Provisional Patent Application 62/113,186, filed Feb. 6, 2015, which is hereby incorporated by reference.

TECHNICAL FIELD

This disclosure relates generally to network security. More specifically, this disclosure relates to an infrastructure monitoring tool for collecting industrial process control and automation system risk data.

BACKGROUND

Processing facilities are often managed using industrial process control and automation systems. Conventional control and automation systems routinely include a variety of networked devices, such as servers, workstations, switches, routers, firewalls, safety systems, proprietary real-time controllers, and industrial field devices. Often times, this equipment comes from a number of different vendors. In industrial environments, cyber-security is of increasing concern, and unaddressed security vulnerabilities in any of these components could be exploited by attackers to disrupt operations or cause unsafe conditions in an industrial facility.

SUMMARY

This disclosure provides an infrastructure monitoring tool for collecting industrial process control and automation system risk data. A method includes discovering multiple devices in a computing system by a risk manager system. The method includes grouping the multiple devices into multiple security zones by the risk manager system. The method includes, for each security zone, causing one or more devices in that security zone to provide information to the risk manager system identifying alerts and events associated with the one or more devices. The method includes storing the information, by the risk manager system, in association with unique identifier values, the unique identifier values identifying different types of information.

In some embodiments, the risk manager system uses the System Center Operations Manager (SCOM) infrastructure monitoring software tool from MICROSOFT CORPORATION. In some embodiments, the risk manager system sends configuration data to the one or more devices in each security zone that defines the alerts and events to be provided by each device. In some embodiments, the one or more devices in that security zone provide information to the risk manager system at the time of discovery and also when additional events are later detected. In some embodiments, the one or more devices in that security zone provide information to the risk manager system at preconfigured intervals. In some embodiments, the risk manager system calculates risks based on the stored information by performing queries using the unique identifier values. In some embodiments, the risk manager system also categorizes the information collected from the one or more devices in each security zone to calculate risk values.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
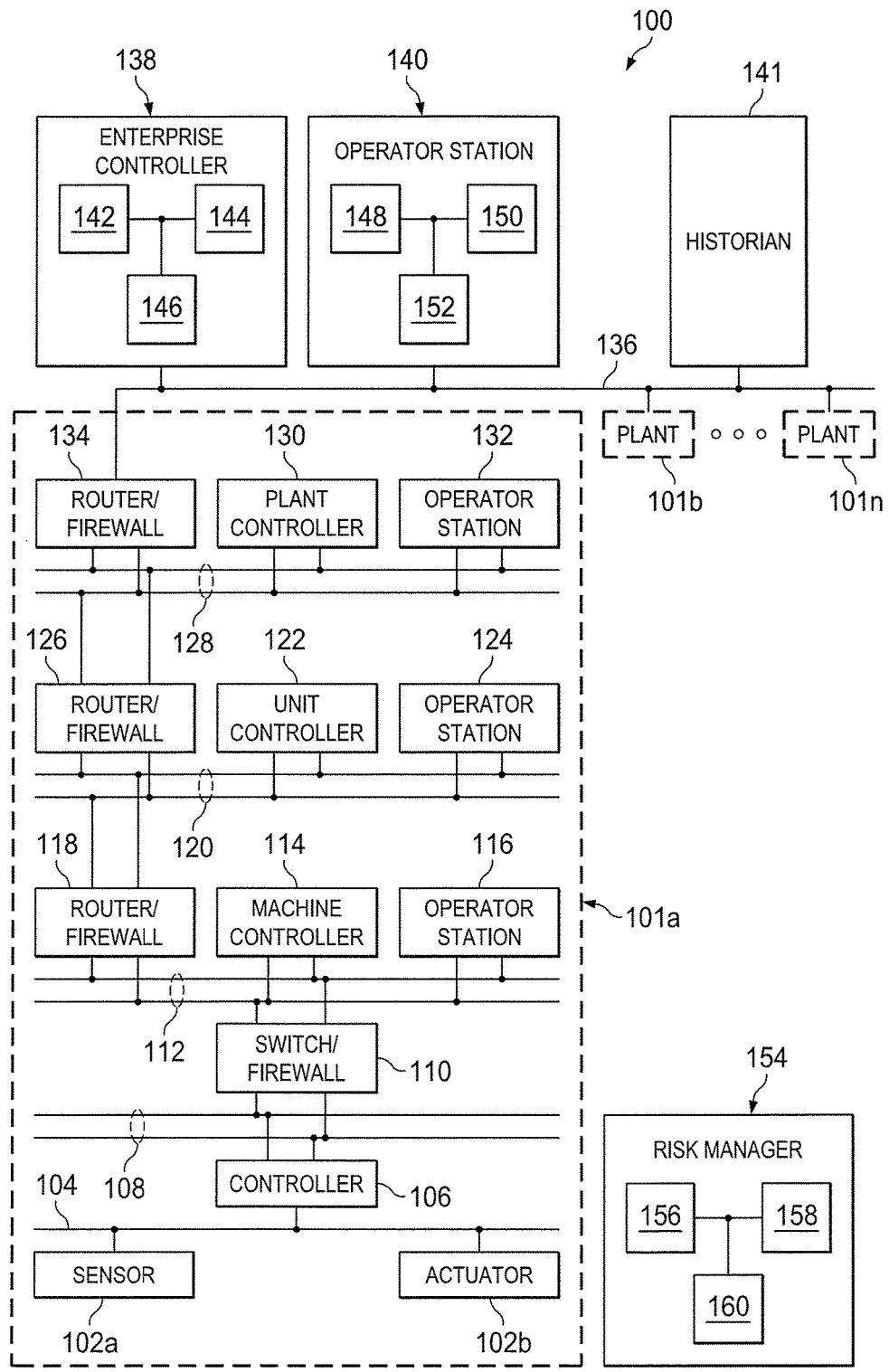
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

As noted above, cyber-security is of increasing concern with respect to industrial process control and automation systems. Unaddressed security vulnerabilities in any of the components in the system 100 could be exploited by attackers to disrupt operations or cause unsafe conditions in an industrial facility. For example, since process control and automation systems can be used to control industrial processes that are exothermic or that involve toxic chemicals or even nuclear power, a disruption to these processes can cause major economic or safety issues. However, in many instances, operators do not have a complete understanding or inventory of all equipment running at a particular industrial site. As a result, it is often difficult to quickly determine potential sources of risk to a control and automation system.

This disclosure recognizes a need for a solution that understands potential vulnerabilities in various systems, prioritizes the vulnerabilities based on risk to an overall system, and automatically/logically collects and categorizes this data. This is accomplished (among other ways) by using a risk manager 154. The risk manager 154 includes any suitable structure that supports the collection of industrial process control and automation system risk data. Here, the risk manager 154 includes one or more processing devices 156; one or more memories 158 for storing instructions and data used, generated, or collected by the processing device(s) 156; and at least one network interface 160. Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the risk manager 154 could be implemented using any suitable hardware or a combination of hardware and software/firmware instructions.

Figure 2:
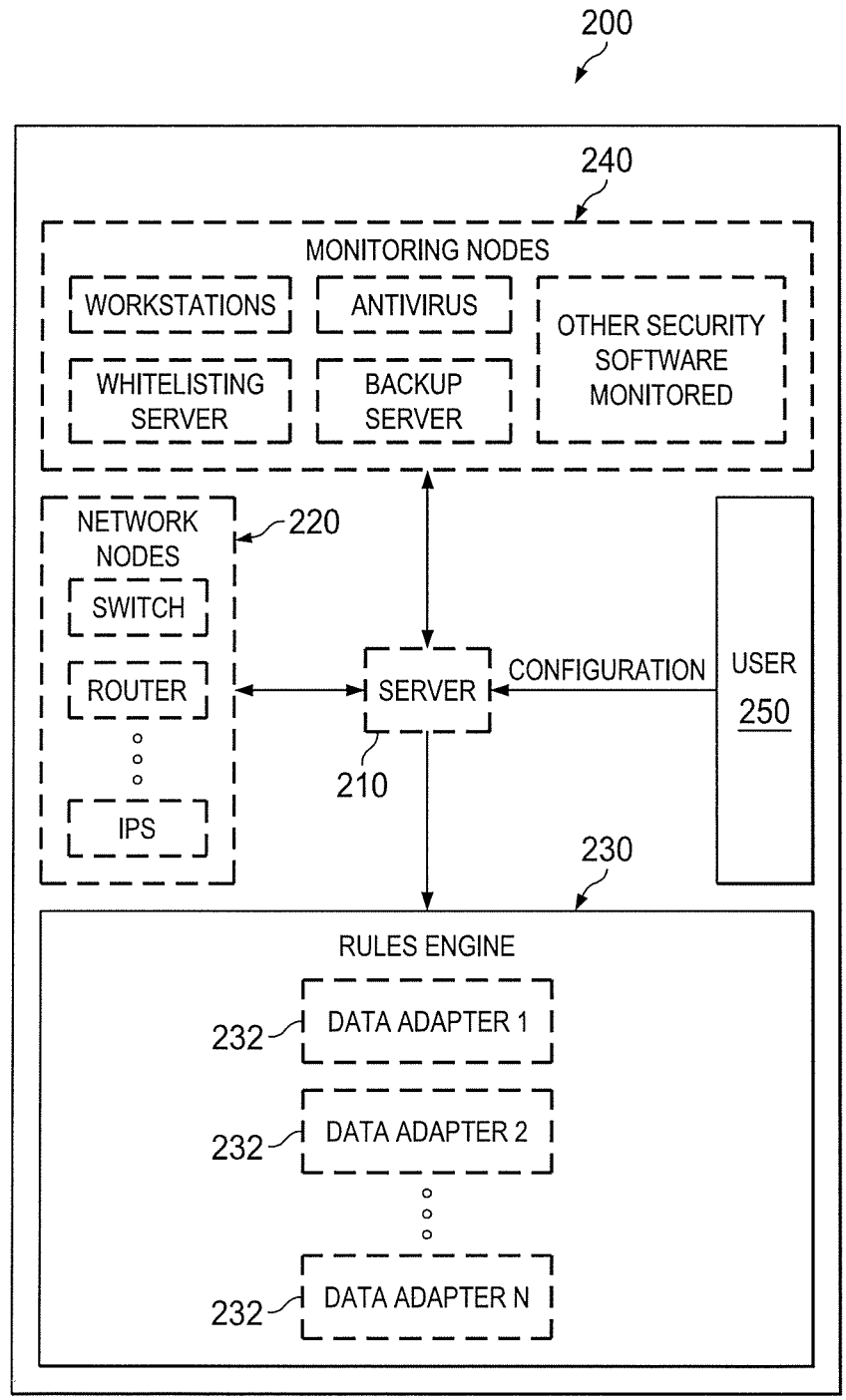
FIG. 2 illustrates an example infrastructure monitoring architecture to collect industrial process control and automation system risk data according to this disclosure.

FIG. 2 illustrates an example infrastructure monitoring architecture 200 to collect industrial process control and automation system risk data according to this disclosure. The architecture 200 could be supported or implemented using the risk manager 154. This architecture 200 collects and analyzes risk data associated with an industrial process control and automation system to identify potential security issues to be resolved.

Architecture 200 includes, in this example, a server 210, network nodes 220, a rules engine 230, monitoring nodes 240, and a user system 250. Server 210 can be implemented as risk manager 154, or as another server data processing system, having such hardware components as a processing device(s), memory, and a network interface. User system 250, similarly, can be any data processing system configured to communicate with server 210 as described herein, and in particular for configuring the processes described herein, and can be also be implemented as risk manager 154. Note that user system 250, in some embodiments, can be implemented on the same physical system as server 210.

Server 210, for example as executed by the risk manager 154, collects various data from monitoring nodes 240, such as data from antivirus tools or application whitelisting tools, Windows security events, network security data (including states of switches, routers, firewalls, and intrusion detection/prevention systems), backup status, patching status, and asset policies. Other examples are shown as monitoring nodes 240, including workstations, whitelisting servers, antivirus systems, backup servers, and other security software. Similarly, network nodes 220 can also be monitored. Network nodes 220 can include switches, routers, intrusion prevention systems (IPSes) including firewalls, and other network devices, whether implemented in hardware or software.

To start monitoring the monitoring nodes 240, a configuration can be loaded into and received by server 210, such as by receiving it from user system 250, loading it from storage, receiving it from another device or process, or otherwise. This configuration can be pushed to the monitoring nodes 240 or network nodes 220 by server 210. The monitoring nodes 240, network nodes 220, and the server 210 know about configuration categories, and each type and subtype of data collection can have its own category identifier. Each node can include software or hardware systems that scan devices for known vulnerabilities on each device or software application (such as out-of-date Windows patches) and monitor the devices continuously for events with security implications (such as virus detections or Windows authentication failures). Areas of monitoring may include, but are not limited to, antivirus, application whitelisting, Windows security events, network security (including state of switches, routers, firewalls, and intrusion detection/prevention systems), backup status, patching status and asset policies. Each node can translate events generated on its device into alerts and assigns its configuration identifier.

In some embodiments, the configuration information can include management packs that are used to lay out unique security/risk item data collection and the categorization of data that will be analyzed by the risk manager 154. The management packs can be configured for each category with a unique configuration identifier for each type of data to be collected. This configuration can be extendable. The management pack configuration, which can be transmitted to and executed on each of the nodes, translates events generated by the nodes or other monitored device into alerts/events that are securely sent to the server 210.

Server 210 can collect or receive this information, analyze the information, and present the information and the analysis results to an operator (such as an administrator), store the information and results, or transmit them to a user system 250. In various embodiments, the alerts/events are categorized and assigned unique identifiers that can be used by the risk manager 154 to poll and query the data for rules engine logic so that the data can be used to calculate risk items to be sent to a risk manager database.

In various embodiments, rules engine 230 uses data adapters 232 to translate data to and from each of the nodes, as necessary, so that the appropriate data can be sent to each node, and so that the data received from each node can be converted into a consistent format for use by server 210. By converting data into a consistent format, rules engine 154 can present a "dashboard" user interface by which the relative risks from each of the monitored nodes can be easily compared.

In some embodiments, the architecture 200 is implemented using the System Center Operations Manager (SCOM) infrastructure monitoring software tool from MICROSOFT CORPORATION. The SCOM tool is normally used to provide information for IT support staff to monitor and fix issues that are collected and reported. The risk manager 154 collects security- and process control-related data, and in some embodiments the SCOM tool is used for this unique and specific data collection. In these embodiments, the risk manager 154 does not use the SCOM tool as an IT support system but rather as a very specific security and risk data collection system to support the risk manager's data organization requirements. Of course, the claimed embodiments are not limited to SCOM implementations unless specifically claimed, and those of skill in the art will appreciate that specific functions or operations described herein as relating to a SCOM tool implementation are not limited to the SCOM tool in particular, but also apply to other implementations of architecture 200 or risk manager 154.

In the process control and automation system 100, the SCOM tool (or other tool) is used to discover devices in the system 100 and to create a database of those devices, grouping the devices into security zones for further analysis. Once this discovery is completed, a management pack can be pushed or sent to a target device for specific security/risk item data collection. When the management pack is started in the monitoring service on the target device for security/risk, it creates a specific set of data that is sent to the SCOM tool based on preconfigured unique identifier values built into SCOM data packets. This process can be repeated for multiple target devices in the system. The data collected by the SCOM tool is utilized by the risk manager 154 based on the unique identifiers that are built into the data from the data collection points. In various embodiments, the design management packs can be specialized for SCOM product connectors.

Various data collection methods could be used by the risk manager 154. For example, data adapters 232 can be registered by the SCOM tool, and operational database queries can be made based on specific data collection. Each data adapter 232 can poll information in preconfigured intervals for its specific security/risk item values. Each operational database query can collect polling information in preconfigured intervals for its specific security/risk item values. This categorized and modular approach for collecting, organizing, and utilizing data in the SCOM tool is one factor that makes this a very different and unique use of the system or risk management tools including the SCOM tool. Once this data has been consumed by the risk manager 154, the data is separated and organized, and rules engine 230 can more efficiently calculate risk values using the collected data. Data adapters 232 can be used for respective data categories and can be registered with the SCOM tool, risk manager 154, or server 210. This enables automation of the data items for use in a modular design, which helps to increase or maximize the system's data collection efficiency.

Figure 3:
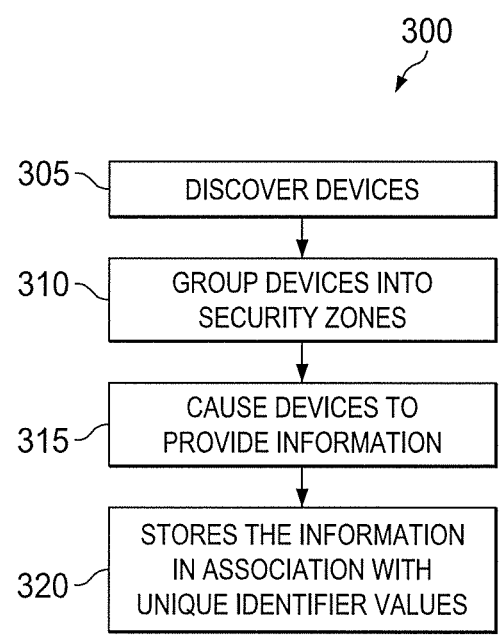
FIG. 3 illustrates a flowchart of a process in accordance with disclosed embodiments.

FIG. 3 illustrates a flowchart of a process 300 in accordance with disclosed embodiments, that can be performed, for example, by risk manager 154, architecture 200, or other device configured to perform as described, including systems that implement some version of SCOM and are modified to perform as described, all of which are referred to generically as the "risk manager system" below.

The risk manager system discovers multiple devices in a computing system (305). These devices can include any of the devices described above as related to architecture 200 or system 100, including in particular any of the devices related to monitoring nodes 240 or network nodes 220.

The risk manager system groups the multiple devices into multiple security zones (310). The devices can be grouped into security zones according to, for example, the type of device, the type of risks presented by the devices, the severity of risks presented by the devices, or other similarities. In particular, security zones could include a security zone corresponding to monitoring nodes 240 and a security zone corresponding to network nodes 220.

For each security zone, the risk manager system causes one or more devices in that security zone to provide information identifying alerts and events associated with the one or more devices and receives this information (315). This can include, for example, by sending management packs or other configuration data to each of the devices that defines the alerts and events to be provided by that device. This information can include industrial process control and automation system risk data. In some cases, a specialized management pack or configuration can alert the risk manager system when there is a change to system software patches. The risk manager system can collect and convert relevant system events into risk alerts, and can get initial information of each device's risk data at discovery and detect additional events and later alert the system as and when those events are detected.

In various embodiments, this information and other alert data can be collected by a data adapter and polled at configured intervals by the server or rules engine so that each respective item of information can be calculated by the rules engine.

The risk manager system stores the information in association with unique identifier values (320), the unique identifier values identifying different types of information. The information, or other event data or alert data, can be queried by the risk manager system using the unique identifier so that the rules engine can calculate risk based on the collected information.

In some embodiments, a monitoring agent can be installed on some or all of the monitored devices to monitor the device for the security or risk information. For devices where an agent cannot be installed, a server or other dedicated agent can be monitored the risk manager system, for example by reading the network device's configuration.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the risk manager 154 can be used. This functionality can be used in any other suitable device or system.

Although FIG. 2 illustrates one example of an infrastructure monitoring architecture 200 to collect industrial process control and automation system risk data, various changes may be made to FIG. 2. For example, the functional division of the components and sub-components in FIG. 2 are for illustration only. Various components or sub-components could be combined, further subdivided, rearranged, or omitted and additional components or sub-components could be added according to particular needs.

Note that the risk manager 154 and/or the infrastructure monitoring architecture 200 shown here could use or operate in conjunction with any combination or all of various features described in the following previously-filed and concurrently-filed patent applications (all of which are hereby incorporated by reference):

- U.S. patent application Ser. No. 14/482,888 entitled "DYNAMIC QUANTIFICATION OF CYBER-SECURITY RISKS IN A CONTROL SYSTEM";
- U.S. Provisional Patent Application No. 62/036,920 entitled "ANALYZING CYBER-SECURITY RISKS IN AN INDUSTRIAL CONTROL ENVIRONMENT";
- U.S. Provisional Patent Application No. 62/113,075 entitled "RULES ENGINE FOR CONVERTING SYSTEM-RELATED CHARACTERISTICS AND EVENTS INTO CYBER-SECURITY RISK ASSESSMENT VALUES" and corresponding non-provisional U.S. patent application Ser. No. 14/871,695 of like title filed concurrently herewith;
- U.S. Provisional Patent Application No. 62/113, 221 entitled "NOTIFICATION SUBSYSTEM FOR GENERATING CONSOLIDATED, FILTERED, AND RELEVANT SECURITY RISK-BASED NOTIFICATIONS" and corresponding non-provisional U.S. patent application Ser. No. 14/871,521 of like title filed concurrently herewith;
- U.S. Provisional Patent Application No. 62/113,100 entitled "TECHNIQUE FOR USING INFRASTRUCTURE MONITORING SOFTWARE TO COLLECT CYBER-SECURITY RISK DATA" and corresponding non-provisional U.S. patent application Ser. No. 14/871,855 of like title filed concurrently herewith;
- U.S. Provisional Patent Application No. 62/113,165 entitled "PATCH MONITORING AND ANALYSIS" and corresponding non-provisional U.S. patent application Ser. No. 14/871,921 of like title filed concurrently herewith;
- U.S. Provisional Patent Application No. 62/113,152 entitled "APPARATUS AND METHOD FOR AUTOMATIC HANDLING OF CYBER-SECURITY RISK EVENTS" and corresponding non-provisional U.S. patent application Ser. No. 14/871,503 of like title filed concurrently herewith;
- U.S. Provisional Patent Application No. 62/114,928 entitled "APPARATUS AND METHOD FOR DYNAMIC CUSTOMIZATION OF CYBER-SECURITY RISK ITEM RULES" and corresponding non-provisional U.S. patent application Ser. No. 14/871,605 of like title filed concurrently herewith;
- U.S. Provisional Patent Application No. 62/114,865 entitled "APPARATUS AND METHOD FOR PROVIDING POSSIBLE CAUSES, RECOMMENDED ACTIONS, AND POTENTIAL IMPACTS RELATED TO IDENTIFIED CYBER-SECURITY RISK ITEMS" and corresponding non-provisional U.S. patent application Ser. No. 14/871,814 of like title filed concurrently herewith;
- U.S. Provisional Patent Application No. 62/114,937 entitled "APPARATUS AND METHOD FOR TYING CYBER-SECURITY RISK ANALYSIS TO COMMON RISK METHODOLOGIES AND RISK LEV- ELS" and corresponding non-provisional U.S. patent application Ser. No. 14/871,136 of like title filed concurrently herewith; and U.S. Provisional Patent Application No. 62/116,245 entitled "RISK MANAGEMENT IN AN AIR-GAPPED ENVIRONMENT" and corresponding non-provisional U.S. patent application Ser. No. 14/871,547 of like title filed concurrently herewith.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   discovering multiple devices in a computing system by a risk manager system;
   grouping the multiple devices into multiple security zones by the risk manager system;
   for each security zone, causing one or more devices in that security zone to provide information to the risk manager system identifying alerts and events associated with the one or more devices according to configuration data sent to the one or more devices by the risk manager system,
   wherein the configuration data defines the alerts and events to be provided by the one or more devices and include a management pack that defines data characterization and can be executed by one or more devices to translate the alerts and events into the information provided to the risk manager system, said management pack configured for each category with a unique configuration identifier for each type of data to be collected;
   storing the information, by the risk manager system, in association with unique identifier values, the unique identifier values identifying different types of information.

2. The method of claim 1, wherein the risk manager system uses the System Center Operations Manager (SCOM) infrastructure monitoring software tool from MICROSOFT CORPORATION.

3. The method of claim 1, wherein the information identifying the alerts and events is collected from at least one of the devices by at least one data adapter that is polled for the information at a configured.

4. The method of claim 1, wherein the one or more devices in that security zone provide information to the risk manager system at the time of discovery and also when additional events are later detected.

5. The method of claim 1, wherein the one or more devices in that security zone provide information to the risk manager system at preconfigured intervals.

6. The method of claim 1, further comprising calculating risks based on the stored information by performing queries using the unique identifier values.

7. The method of claim 1, further comprising categorizing the information collected from the one or more devices in each security zone to calculate risk values.

8. The method of claim 1, wherein the multiple security zones according to one of: a type of each device, a type of risk presented by each device, and
   a severity of risks presented by each device.

9. A risk manager system comprising:
   a controller; and
   a display;
   wherein the controller is configured to:
      discover multiple devices in a computing system;
      group the multiple devices into multiple security zones;
      for each security zone, cause one or more devices in that security zone to provide information identifying alerts and events associated with the one or more devices according to configuration data sent to the one or more devices by the controller,
   wherein the configuration data defines the alerts and events to be provided by the one or more devices and include a management pack that defines data characterization and can be executed by one or more devices to translate the alerts and events into the information provided to the risk manager system, said management pack configured for each category with a unique configuration identifier for each type of data to be collected; and
   store the information in association with unique identifier values, the unique identifier values identifying different types of information.

10. The risk manager system of claim 9, wherein the controller is configured to use a system uses the System Center Operations Manager (SCOM) infrastructure monitoring software tool from MICROSOFT CORPORATION.

11. The risk manager system of claim 9, wherein the controller comprises a rules engine with at least one data adapter, each data adapter configured to collect the information identifying the alerts and events from at least one of the devices and to provide the collected information when polled at a configured interval.

12. The risk manager system of claim 9, wherein the controller is configured to receive the information from the one or more devices in each security zone at a time of discovery and also when additional events are later detected.

13. The risk manager system of claim 9, wherein the controller is configured to receive the information from one or more devices in each security zone at preconfigured intervals.

14. The risk manager system of claim 9, wherein the controller is further configured to calculate risks based on the stored information by performing queries using the unique identifier values.

15. The risk manager system of claim 9, wherein the controller is further configured to categorize the information collected from the one or more devices in each security zone to calculate risk values.

16. The risk manager system of claim 9, wherein the multiple devices are grouped into the multiple security zones according to one of a type of each device, a type of risk presented by each device, and a severity of risks presented by each device.

17. A non-transitory machine-readable medium encoded with executable instructions that, when executed, cause one or more processors of a risk manager system to:
discover multiple devices in a computing system;
group the multiple devices into multiple security zones;
for each security zone, cause one or more devices in that security zone to provide information identifying alerts and events associated with the one or more devices according to configuration data sent to the one or more devices by the risk manager system,
wherein the configuration data defines the alerts and events to be provided by the one or more devices and include a management pack that defines data characterization and can be executed by one or more devices to translate the alerts and events into the information provided to the risk manager system, said management pack configured for each category with a unique configuration identifier for each type of data to be collected; and
store the information in association with unique identifier values, the unique identifier values identifying different types of information.

18. The non-transitory machine-readable medium of claim 17, wherein the risk manager system uses the System Center Operations Manager (SCOM) infrastructure monitoring software tool from MICROSOFT CORPORATION.

19. The non-transitory machine-readable medium of claim 17, further encoded with executable instructions that when executed cause the one or more processors of the risk manager system to:
receive the information identifying the alerts and events from at least one of the devices using at least one data adapter that is configured to be polled for the information at a configured interval.

20. The non-transitory machine-readable medium of claim 17, further encoded with executable instructions that when executed cause the one or more processors of the risk manager system to:
receive the information from the one or more devices in each security zone at a time of discovery and also when additional events are later detected.

21. The non-transitory machine-readable medium of claim 17, further encoded with executable instructions that when executed cause the one or more processors of the risk manager system to:
receive the information from the one or more devices in each security zone at preconfigured intervals.

22. The non-transitory machine-readable medium of claim 17, further encoded with executable instructions that when executed cause the one or more processors of the risk manager system to:
calculate risks based on the stored information by performing queries using the unique identifier values.

23. The non-transitory machine-readable medium of claim 17, wherein the multiple devices are grouped into the multiple security zones according to one of: a type of each device, a type of risk presented by each device, and a severity of risks presented by each device.

* * * * *